April 24, 1928.

H. FORD 1,667,202

METHOD OF MANUFACTURING PISTONS

Filed April 22, 1926

INVENTOR
Henry Ford.
BY
ATTORNEY

April 24, 1928.
H. FORD
1,667,202
METHOD OF MANUFACTURING PISTONS
Filed April 22, 1926        2 Sheets-Sheet 2
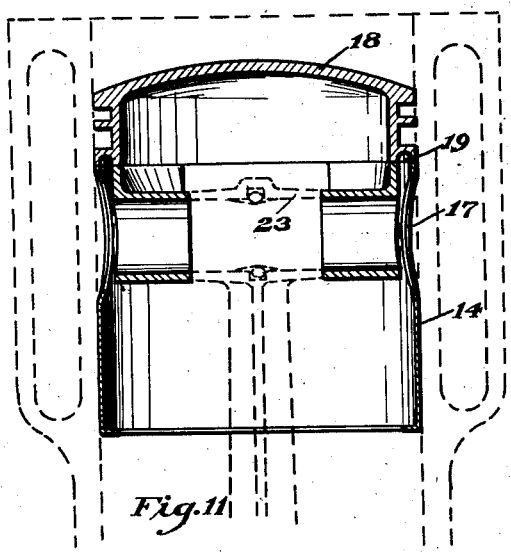
Fig. 11
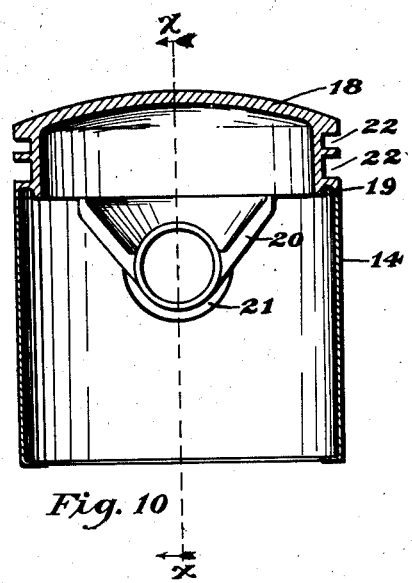
Fig. 10
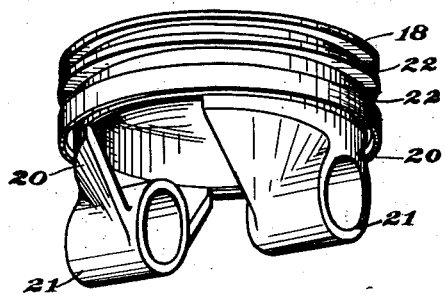
Fig. 12
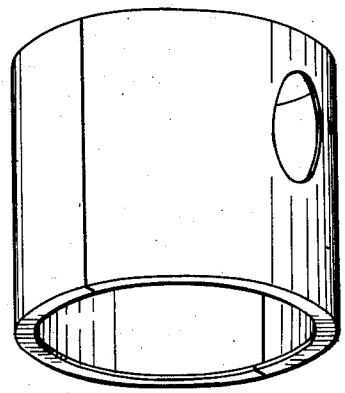
INVENTOR
Henry Ford.
BY
ATTORNEY Patented Apr. 24, 1928.

1,667,202

UNITED STATES PATENT OFFICE.

HENRY FORD, OF DEARBORN, MICHIGAN.

METHOD OF MANUFACTURING PISTONS.

Application filed April 22, 1926. Serial No. 103,952.

My invention relates to pistons and methods of making pistons and has for its object to provide a steel piston of very light weight, and having substantially the same co-efficient of expansion of that of the cylinder walls, thus assuring a tight fit which will cause the engine to exert a greater power than would result from the use of pistons heretofore constructed. Furthermore, a piston, made of the material and built up from sheet steel parts in the manner in which I propose, will greatly reduce the cost of manufacture and increase the efficiency of the piston. I accomplish this object by building up the piston from sheet steel blanks and then assembling the parts into a complete piston.

In the accompanying drawings I have illustrated the several parts which are made and assembled to constitute a piston in which:

Figs. 6 and 7 are combined to form the head and wrist-pin support.

Fig. 10, is a section through Fig. 9 on line $y$—$y$.

Fig. 11, is a section through Fig. 10 on line $x$—$x$.

Figure 12 shows the parts ready for the final welding operation which unites the skirt and head of the piston.

Figure 1:
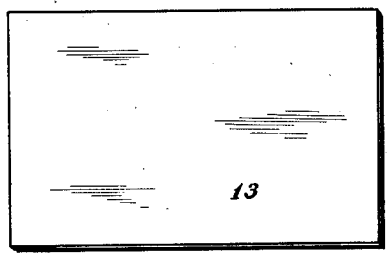
Fig. 1, is a blank of relatively thin sheet steel.
Figure 2:
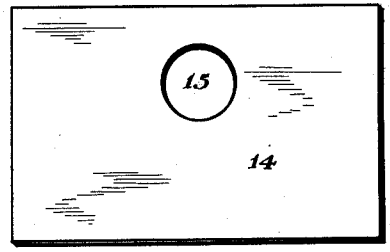
Fig. 2, is the same blank as in Fig. 1, but with a clearance opening punched therein through which a wrist-pin may be inserted.
Figure 3:
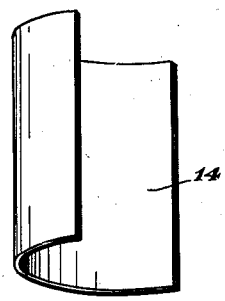
Fig. 3, is an illustration of the effect of the first stamping operation which bends the blank into a semi-circle. This, with a duplicate thereof, forms the main body of the piston.
Figure 4:
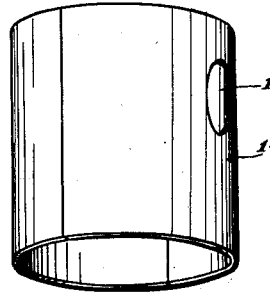
Fig. 4, is an illustration of the duplicate parts joined together by a butt welding operation to unite the edges and form a cylindrical member.
Figure 5:
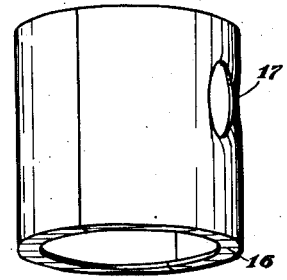
Fig. 5, is the same cylindrical member as in Fig. 4, but with a skirt drawn on the bottom and the walls pressed inwardly around the opening through which the wrist-pin is to be inserted.

In the accompanying drawings reference numerals are employed to illustrate the several parts. 13 is a blank of sheet steel cut of proper length and width so that when stamped in the form shown in Fig. 3, it will form one half of the cylindrical member which constitutes the main body of the piston. 14 is the same blank, but with an opening 15 produced therein of sufficient diameter to readily permit the insertion of a wrist-pin through it. This is the second operation. A duplicate of the blank 14 is made and both are formed as shown in Fig. 3, and these two blanks are then placed together and their edges butt-welded, thereby forming the cylindrical member as shown in Fig. 4. The metal forming the bottom of this cylindrical member is drawn to form a skirt, 16. The cylindrical member illustrated in Fig. 5 is then bent inwardly around the opening 15, as shown at 17. This inward bending serves to relieve the sharp edges around the opening 15 from coming in contact with the cylinder wall.

Figure 6:
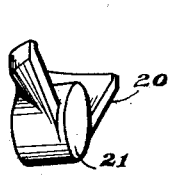
Fig. 6, is one member of the wrist-pin support, of which there are two for each piston, as shown in Fig. 8.
Figure 7:
Fig. 7 is the piston head of thicker material to receive the wrist pin support members and has an annular groove in the bottom thereof.
Figure 8:
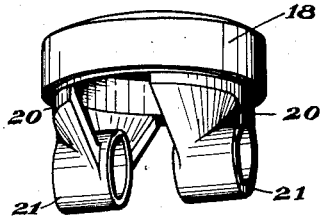
Fig. 8, illustrates how
Figure 9:
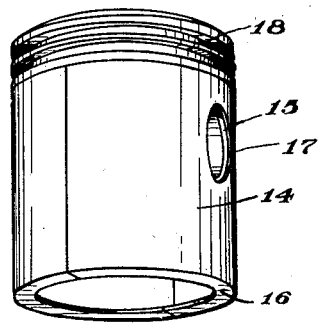
Fig. 9, illustrates all of the parts assembled, and grooves cut in the piston head to receive the piston rings.

I then provide a suitable blank of thicker material from which I form a piston head 18 as illustrated in Fig. 7, and, which is provided with an annular groove, 19, in the bottom thereof, thereby forming a pair of spaced concentric flanges on the lower outer edge of the head. Duplicate wrist pin supports (20) illustrated in Figures 6 and 8 are mounted opposite to each other so as to bring the bearings (21) of the wrist pin in alignment, and are secured to the inner flange on the head by a butt welding operation. After the wrist pin supports have thus been secured to the piston head, the latter is mounted upon the top of the members 14, as illustrated in Fig. 10, and secured thereto by a welding operation, the upper edge of the members (14) being welded to the outer flange on the head. The groove 22 for the insertion of piston rings may be cut in the piston head either before or after the assembly. A wrist-pin, 23, is shown in dotted lines in Fig. 11, and is supported in the bearings, 21, and passes through the head of the connecting rod, also shown in dotted lines, in Fig. 11.

While these operations are several in number they are very easy of accomplishment and the piston may be thus built up to form a strong and very light piston which will better maintain its relation to the cylinder walls than pistons heretofore constructed, and will be less expensive to manufacture. A heavy duty is required of the wrist-pin support 20, and therefore I prefer that this shall be a drop-forging.

Having fully described my invention and the means by which it may be practiced, what I claim is:

1. A method of building up a piston from separate parts, which consists in cutting blanks from sheet-metal and forming them into semi-circles and uniting the semi-circular pieces to form a cylindrical body; forming a piston head and securing thereto wrist-pin bearings and uniting the piston head to the cylindrical body.

2. The method of manufacturing pistons which consists in forming a head of relatively thick material, said head having an annular flange adjacent to its lower edge, forming a tubular skirt of thinner material, and butt welding the edge of the skirt to the flange, the cross section of the flange and skirt adjacent to the weld being substantially the same.

3. The method of manufacturing pistons which consists in forming a head of relatively thick material, said head having spaced concentric flanges at its lower edge, butt welding a tubular skirt to one of said flanges and butt welding a pair of similar wrist pin supports to the other flange.

4. The method of manufacturing pistons which consists in forming a head, a skirt, and wrist pin support, and then butt welding the skirt and the wrist pin support to the head, the parts being so shaped that the cross sectional area of each of said parts adjacent to the place it is welded is substantially equal to the corresponding area of the adjoining part.

Signed at the city of Dearborn, county of Wayne, State of Michigan, this 15th day of April, 1926.

HENRY FORD.